Figure 1:
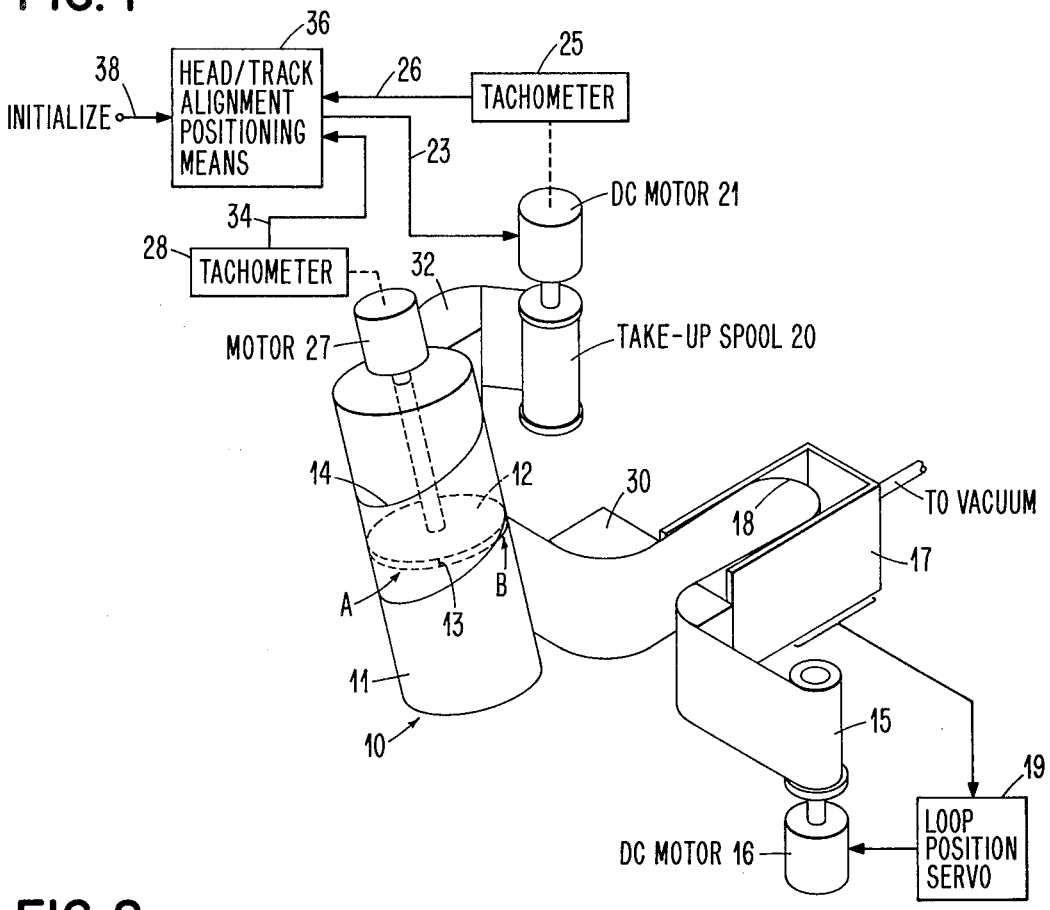
Figure 2:
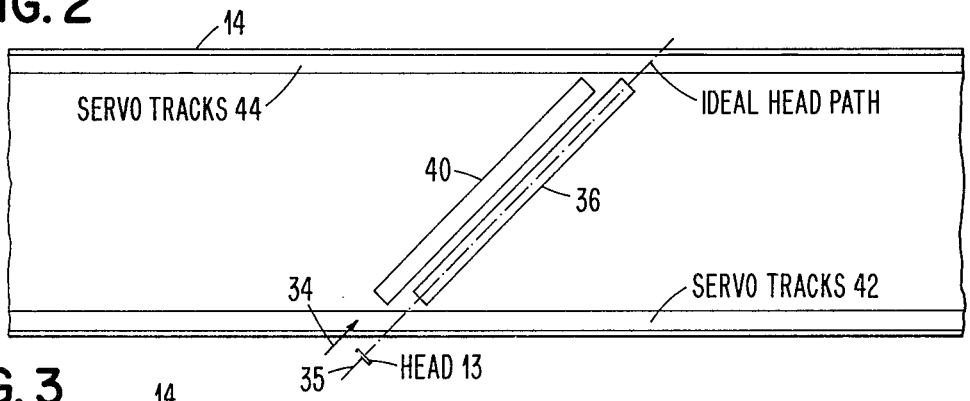
Figure 3:
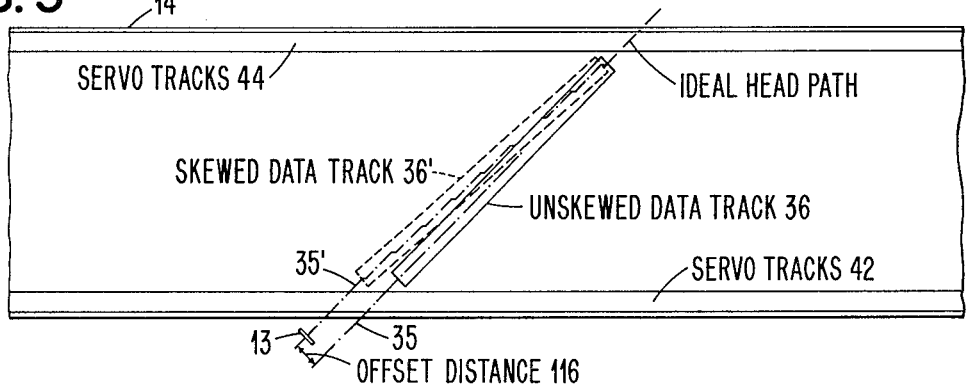
Figure 4:
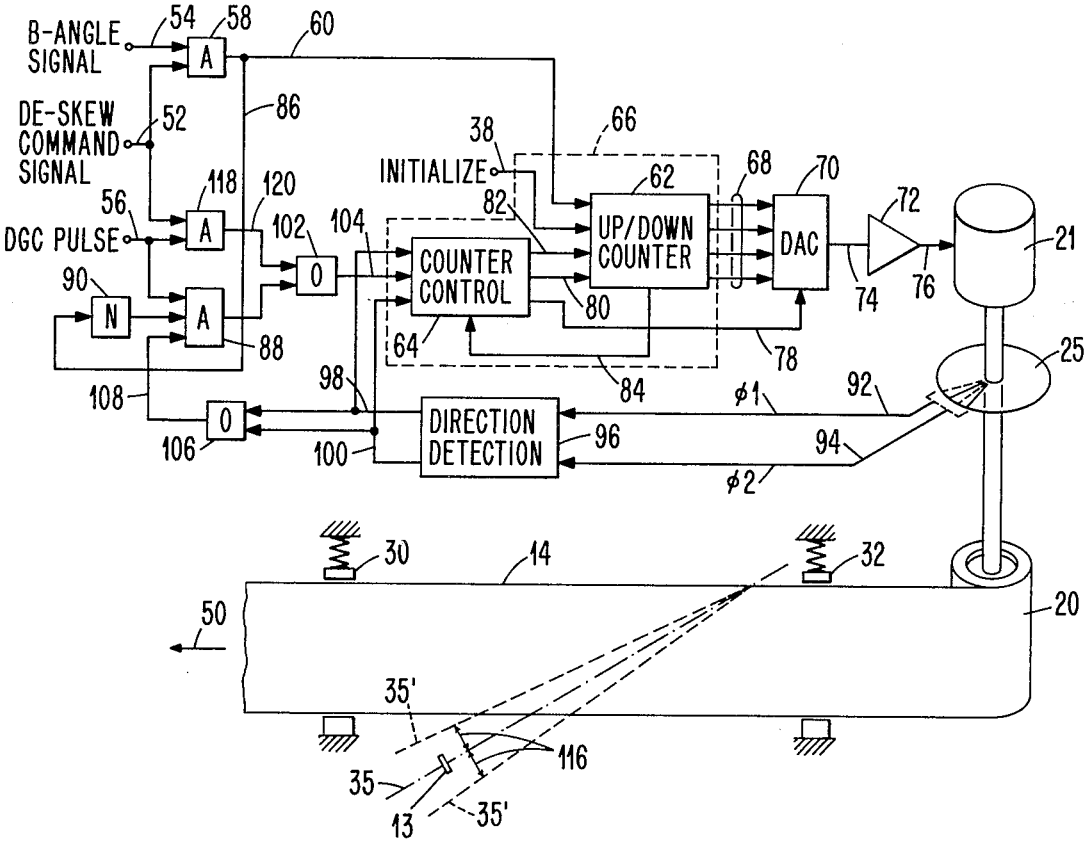
Figure 5:
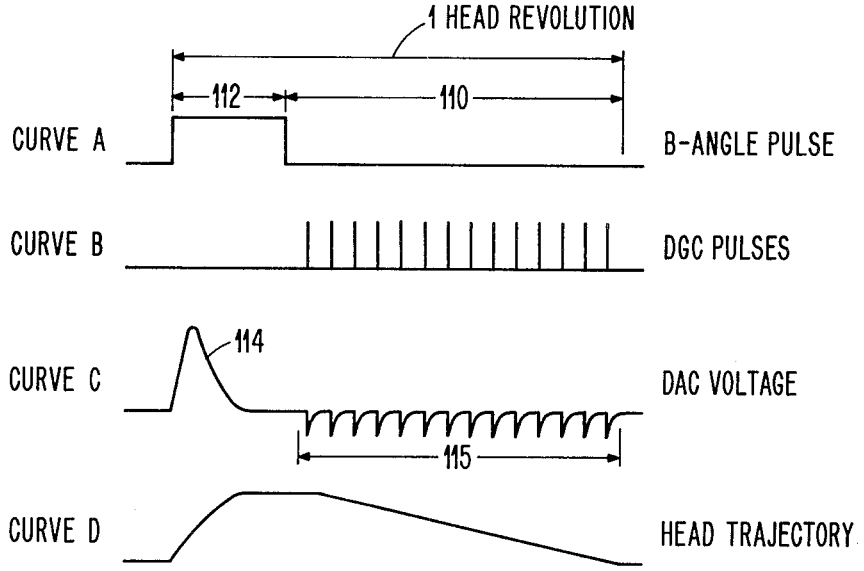

United States Defensive Publication [19] (H) [11] T959,012

Arter et al. [43] June 7, 1977

[54] DYNAMIC DESKEWING FOR A ROTATING HEAD RECORDING DEVICE

[76] Inventors: Nelson Kay Arter, 8687 Morton Road, Longmont, Colo. 80501; Thomas Franklin Eichhorn, 8555 Hollyhock Lane, Lafayette, Colo. 80026; Howard Carl Jackson, 808 E. Cty. Road, No. 4, Berthoud, Colo. 80513

[21] Appl. No.: 682,549

[22] Filed: May 3, 1976

[51] Int. Cl.[2] ..... G11B 21/10

[52] U.S. Cl. ..... 360/76; 360/77

[57] ABSTRACT

In a rotating head magnetic media transport device, skew between data tracks recorded on the magnetic media and a magnetic transducer is corrected, dynamically, by a closed loop controlled servo system. When the magnetic transducer is not in transducing relationship with magnetic media 14 (that is, the magnetic transducer is not under the tape), an offset number is placed into stop/lock counting means 66. The stop/lock counting means is positioned within the closed loop of the servo system. The stop/lock counting means outputs a series of pulses as the offset number is decremented to zero. The pulses are converted to analog voltages which in turn energize a motor which rotates a take-up spool (capstan) on which the media is wound while passing said magnetic transducer. Due to lateral translation of said media, whenever the count in the stop/lock counting means is zero the magnetic transducer is positioned in registry with the selected data track on the magnetic media.

When the magnetic transducer is in transducing relationship with the media (i.e. under the media) a relatively low value digital number, for example, "one" is loaded into the stop/lock counting means. In like fashion, the "one" is decremented to zero. This process (i.e. the loading/decrementing) continues for a selected number of times or until the magnetic transducer exits the magnetic media. As the stop/lock counting means is loaded and decremented, a pulse is outputted which controls the take-up spool motor to continually step the media a finite distance, which in effect, continually alters the effective angle at which data is transduced from the magnetic media. This continual motion generates a new head/tape trajectory which brings the magnetic transducer into registry with the skew data stripe on said media.

20 Claims, 2 Sheets Drawing,

36 Pages Specification

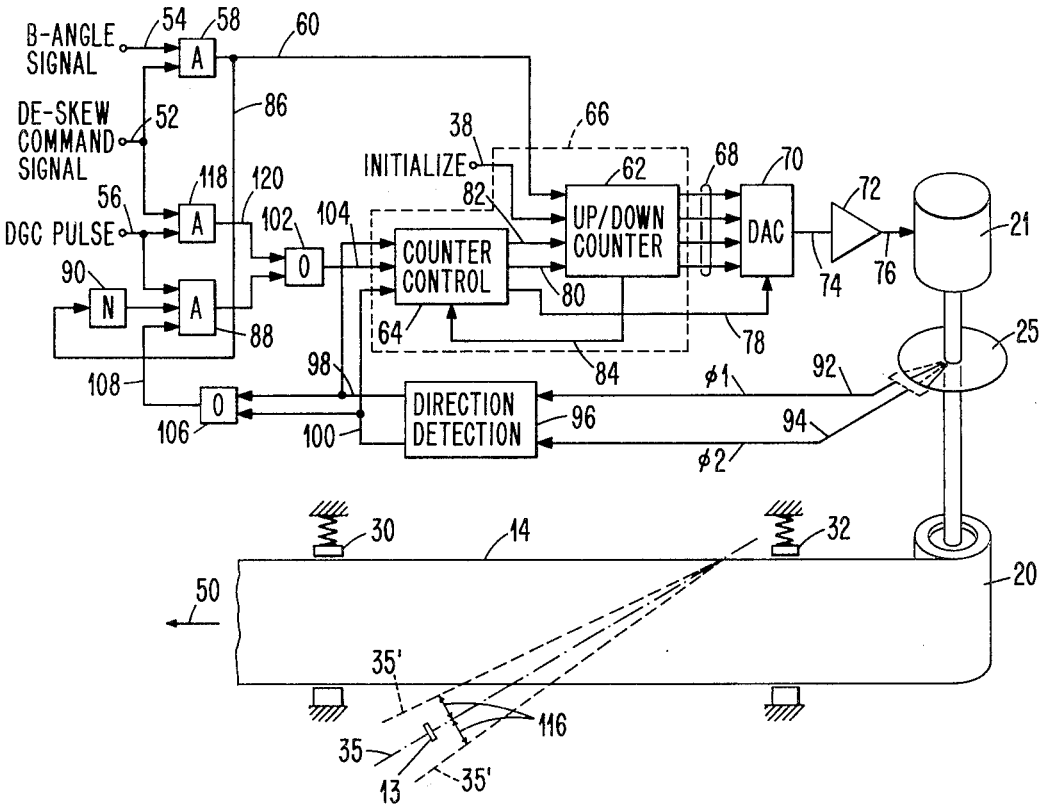

The file of this unexamined application may be inspected and copies thereof may be purchased (849 O.G. 1221, Apr. 9, 1968).